United States Patent

Taya et al.

[11] Patent Number: 5,603,862
[45] Date of Patent: Feb. 18, 1997

[54] BOILER WATER TREATMENT COMPOSITION

[75] Inventors: Shiro Taya, Hachioji; Takayasu Ueda, Sagamihara; Moriyasu Itoh, Ebina, all of Japan

[73] Assignee: Kurita Water Industries Ltd., Tokyo, Japan

[21] Appl. No.: 433,952

[22] Filed: May 4, 1995

Related U.S. Application Data

[63] Continuation of Ser. No. 172,305, Dec. 23, 1993, abandoned.

[30] Foreign Application Priority Data

Dec. 25, 1992 [JP] Japan ................... 4-359035
May 17, 1993 [JP] Japan ................... 5-139068

[51] Int. Cl.⁶ .................................. C02F 5/02
[52] U.S. Cl. .................. 252/181; 252/175; 210/696; 510/234; 510/269
[58] Field of Search ................ 252/80, 82, 86, 252/87, 175, 181; 210/696, 698

[56] References Cited

U.S. PATENT DOCUMENTS

| | | | |
|---|---|---|---|
| 3,235,324 | 2/1966 | Merriman | 252/87 |
| 3,293,159 | 12/1966 | Mekjean et al. | 252/87 |
| 4,019,859 | 4/1977 | Lavin et al. | 252/87 |
| 4,049,467 | 9/1977 | Rubin | 134/2 |
| 4,711,725 | 12/1987 | Amick et al. | 252/180 |
| 4,816,177 | 3/1989 | Nelson et al. | 252/181 |
| 4,874,541 | 10/1989 | Steimel et al. | 252/81 |
| 4,937,002 | 6/1990 | Bainbridge et al. | 252/180 |
| 5,078,891 | 1/1992 | Sherwood et al. | 210/699 |
| 5,264,179 | 11/1993 | Taya et al. | 422/16 |

FOREIGN PATENT DOCUMENTS

| | | |
|---|---|---|
| 1058384 | 2/1992 | Canada . |
| 321066 | 7/1992 | European Pat. Off. . |
| 603811 | 6/1994 | European Pat. Off. . |
| 1258068 | 12/1971 | United Kingdom . |

Primary Examiner—Prince Willis, Jr.
Assistant Examiner—James M. Silbermann
Attorney, Agent, or Firm—Millen, White, Zelano & Branigan, P.C.

[57] ABSTRACT

There disclosed a boiler compound which comprises as the effective components thereof: (A) metabisulfurous acid or metabisulfites; (B) aliphatic dicarboxylic acids or salts thereof represented by the general formula:

$$M^1OOC-(CH_2)_n-COOM,$$

wherein $M^1$ and $M^2$ are each a hydrogen atom, a sodium atom, a potassium atom or an ammonium group and n is an integer of 1 to 10; and optionally (C) a water-soluble polymer for scale inhibitor. The boiler compound is safe for human health, has excellent stability, can be used as a liquid formulation having anticorrosion activity (activity of eliminating oxygen) or both of anticorrosion activity and antiscale activity and exhibits enhanced anticorrosion activity by increasing concentration of sulfite ion which is an oxygen scavenger.

16 Claims, No Drawings

BOILER WATER TREATMENT COMPOSITION

This is a continuation of application Ser. No. 08/172,305, filed Dec. 23, 1993, now abandoned.

BACKGROUND OF THE INVENTION

1. Field of the Invention

The present invention relates to a novel composition for the treatment of boiler water and to a method of treating boiler water. More particularly, it relates to a boiler water treatment composition human health, has excellent stability, can be used as a liquid formulation having anticorrosion activity (activity of eliminating oxygen) or both of anticorrosion activity and antiscale activity and exhibits enhanced anticorrosion activity by increasing concentration of sulfite ion which is an oxygen scavenger.

2. Description of the Prior Art

Various kinds of oxygen scavengers for example hydrazine and sodium sulfite, have heretofore been used for prevention of corrosion in boilers. However, hydrazine has a drawback that it has a safety issue for human health. Sodium sulfite has drawbacks that its concentration in a solution tank is decreased by reaction with dissolved oxygen because of excessively large rate of reaction with oxygen and corrosion is not effectively inhibited or may even be accelerated because of the resultant insufficient addition and that a large amount of a solution of the compound has to be added to a boiler because the amount of the compound dissolved into the solution is limited when the compound is dissolved together with an alkali agent, such as sodium hydroxide and the like, or a polymer to form a liquid composite and this situation causes problems such as alkali corrosion and carrying-over because of excessive addition of the compound or the alkali agent. There is also known a method in which an agent containing an organic polybasic acid having two or more carboxyl groups is used for treatment of boiling water in a boiler in combination with sulfite (Japanese Patent Application Laid-Open No. 1992-232285). However, this method has the same drawbacks as those described above caused by using the sulfite.

Boiler water treatment compositions containing organic oxygen scavengers have been used to replace the aforementioned agents. However, these compounds have a drawback that measurement of residual concentration of the oxygen scavenger is difficult and the amount of addition of the composition is not easily adjusted in such a manner that concentration of the scavenger compound is always kept at the optimum value.

SUMMARY OF THE INVENTION

The present invention accordingly has an object to provide a boiler water treatment composition which is safe for human health, has excellent storage stability, can be used as a liquid formulation having anticorrosion activity (activity of eliminating oxygen) or both of anticorrosion activity and antiscale activity and exhibits enhanced anticorrosion activity by increasing concentration of sulfite ion which is used an oxygen scavenger.

Extensive investigations undertaken by the present inventors with the object described above lead to discovery that metabisulfurous acid, metabisulfites, specific aliphatic dicarboxylic acids and salts of the specific aliphatic dicarboxylic acids are safe for human health and a combination of these compounds exhibits an excellent effect for the prevention of corrosion by the synergistic effect, that concentration of sulfite ion which is the effective component for oxygen elimination can be increased significantly by using metabisulfurous acid or metabisulfites and that prevention of scale formation can be effectively achieved together with prevention of corrosion by using a water-soluble polymer for scale inhibitor in combination with the aforementioned compounds. The present invention has been completed on the basis of the discovery.

Thus, the present invention provides a boiler water treatment composition which comprises as the effective components thereof: (A) at least one kind selected from the group consisting of metabisulfurous acid and metabisulfites; and (B) at least one kind selected from the group consisting of aliphatic dicarboxylic acids and salts thereof represented by the general formula:

$$M^1OOC-(CH_2)_n-COOM^2,$$

wherein $M^1$ and $M^2$ are each a hydrogen atom, a sodium atom, a potassium atom or an ammonium group and may be the same or different from each other and n is an integer of 1 to 10.

The present invention also provides a boiler water treatment composition which comprises as the effective components thereof: said component (A); said component (B); and (C) a water-soluble polymer for scale inhibitor.

Other and further objects, features and advantages of the invention will appear more fully from the following description.

DETAILED DESCRIPTION OF THE INVENTION

In the boiler water treatment composition of the present invention, (A) is at least one member of the group consisting of metabisulfurous acid and metabisulfites is used. A metabisulfite having good solubility in water can be used and the kind of the metabisulfite used is not particularly limited. Preferable examples of the metabisulfite are sodium salt, potassium salt, ammonium salt and the like. The metabisulfite may be used singly or as a combination of two or more kinds.

In the boiler compound of the present invention, (B) is at least one members of the group consisting of aliphatic dicarboxylic acids and salts thereof represented by the general formula:

$$M^1OOC-(CH_2)_n-COOM^2 \qquad (1),$$

wherein $M^1$, $M^2$ and n are as defined above, is used. Examples of the aliphatic dicarboxylic acid are malonic acid (n=1), succinic acid (n=2), glutaric acid (n=3), adipic acid (n=4), pimelic acid (n=5), suberic acid (n=6), sebacic acid (n=8), decandicarboxylic acid (n=10) and the like. Among them, compounds having n in the range of 1 to 6 are preferable. Examples of the salt of aliphatic dicarboxylic acid are sodium salts, potassium salts and ammonium salts. The salt may be a monosalt or a disalt. The salt of aliphatic dicarboxylic acid may be used singly or as a combination of two or more kinds.

In the boiler water treatment composition of the present invention, (C) is a water-soluble polymer for use as a scale inhibitor according to desire when scale prevention is particularly required. Examples of the water-soluble polymer for scale inhibitor are polyacrylic acid, polymaleic acid, polymethacrylic acid, copolymers of acrylic acid and acrylamide, copolymers of acrylic acid and hydroxyallyoxypropanesulfonic acid and salts thereof. The kind of salt used is not particularly limited and any salt having good solubility in water can be used. Examples of the salt are sodium salts, potassium salts, ammonium salts and the like. The water-soluble polymer used as scale inhibitor as component (C) may be used singly or as a combination of two or more kinds.

An alkali agent is generally contained in the boiler compound of the present invention. Examples of the alkali agent are sodium hydroxide, potassium hydroxide, sodium carbonate, potassium carbonate and the like. The alkali agent may be used singly or as a combination of two or more kinds.

Order of addition of the components in the boiler water treatment composition of the present invention is not particularly limited and the components may be added in a desired order. The aliphatic dicarboxylic acid or the salt thereof of the component (B) is employed in an amount of 1 to 50000 weight %, preferably 10 to 150 weight %, based on the amount of the metabisulfurous acid or the metabisulfite of the component (A). The water-soluble polymer used as scale inhibitor as component (C) is employed in an amount of 1 to 200 weight %, preferably 1 to 100 weight %, more preferably 5 to 30 weight %, based on the amount of the metabisulfurous acid or the metabisulfite of the component (A). The alkali agent is employed in an amount of 10 to 100000 weight %, preferably 30 to 300 weight %, based on the amount of the metabisulfurous acid or the metabisulfite of the component (A). When the ratio of amounts of component (A) and component (B) is out of the specified range, the synergistic effect of the two components is not exhibited sufficiently.

It is preferred that pH of the boiler water treatment composition of the present invention is 12.0 or higher because stability of the sulfite ion which is derived from hydrolysis of component (A) is enhanced significantly.

It is preferred that the boiler water treatment composition of the present invention is used in an amount of 0.01 to 1000 mg/liter, preferably 10 to 500 mg/liter, based on the amount of the supplied water in the boiler. When the amount is less than 0.01 mg/liter, the object of the present invention is not achieved sufficiently. When the amount is more than 1000 mg/liter, the effect of prevention of corrosion is not so much enhanced as expected from the used amount.

Mechanism of prevention of corrosion by the boiler water treatment composition of the present invention is described in the following. When potassium metabisulfite ($K_2S_2O_5$) is used as component (A), 1 mol of $K_2S_2O_5$ is hydrolyzed to form 2 mols of potassium hydrogensulfite ($KHSO_3$).

$$K_2S_2O_5 + H_2O \rightarrow 2KHSO_3 \quad (2)$$

Reaction of $KHSO_3$ with an alkali agent (for example, potassium hydroxide) leads to formation of potassium sulfite ($K_2SO_3$).

$$KOH + KHSO_3 \rightarrow K_2SO_3 + H_2O \quad (3)$$

Thus, 1 mol of $K_2S_2O_5$ produces 2 mols of $K_2SO_3$ by the reaction with 2 mols of KOH.

$$K_2S_2O_5 + 2KOH \rightarrow 2K_2SO_3 \quad (4)$$

This means that 1 mg of $K_2S_2O_5$ consumes 0.5 mg of KOH to form 0.72 g of $SO_3^{2-}$ ion which reacts with 0.144 mg of oxygen.

An aliphatic dicarboxylic acid or a salt thereof reacts with iron ion dissolved from an apparatus by corrosion and forms a barely water soluble compound. Thus, a coating layer in the passive state is formed on the surface of iron to prevent further corrosion.

Corrosion reaction of iron in the presence of oxygen can be expressed as follows.

Reaction at anode to dissolve iron $\quad Fe \longrightarrow Fe^{2+} + 2e^-$ [5]

Reaction at cathode $\quad 1/2O_2 + 2e^- \longrightarrow 2OH^-$ [6]

Therefore, $$Fe + \tfrac{1}{2}O_2 + H_2O \rightarrow Fe(OH)_2 \quad (7)$$

The reaction proceeds further as following.

$$2Fe(OH)_2 + \tfrac{1}{2}O_2 \rightarrow Fe_2O_3 + 2H_2O \quad (8)$$

Reaction of a metabisulfite to eliminate oxygen proceeds via $K_2SO_3$ formed by the reaction [4] according to the following equation.

$$K_2SO_3 + \tfrac{1}{2}O_2 \rightarrow K_2SO_4 \quad (9)$$

When the sulfite ion ($SO_3^{2-}$) is present in a sufficient amount in relation to the amount of oxygen, oxygen is eliminated and the reaction at cathode [6] is suppressed to exhibit the effect of prevention of corrosion.

However, when the amount of the sulfite ion ($SO_3^{2-}$) is insufficient in relation to the amount of oxygen, the effect expressed by the reaction [9] is decreased to cause insufficient suppressing of the cathode reaction and corrosion is enhanced. The formation of a coating layer in the passive state on the surface of iron metal with a barely water soluble compound formed by the reaction of the aliphatic dicarboxylic acid and iron ion can suppress the anode reaction [5] even in such a condition.

The invention will be understood more readily with reference to the following examples; however, these examples are intended to illustrate the invention and are not to be construed to limit the scope of the invention.

Preparation Example 1

Into a 1 liter beaker, pure water, $K_2S_2O_5$, KOH and an aliphatic dicarboxylic acid listed in Table 1 were charged in this order at room temperature. The charged components were mixed to make a solution and a boiler water treatment composition shown in Table 1 was prepared. Concentration of $SO_3^{2-}$ ion and effective concentration of KOH (concentration obtained by subtracting the amount consumed by the decomposition reaction of $K_2S_2O_5$ from the charged concentration) were selected first and concentrations of each components were decided on the basis of these concentrations.

The boiler water treatment composition prepared above was left standing for 1 week in a chamber kept at a constant temperature of −5° C. and then any change in appearance was evaluated by visual observation according to the following criterion:

○: Solution was clear and no precipitate was found.

Δ: Solution is turbid.

×: A large amount of precipitate was found and solution was frozen.

oxygen while 50 mg of Sample 13 (a conventional agent) is required for eliminating the same amount of oxygen.

TABLE 1

| sample No. | concentration of $SO_3^{2-}$ (wt. %) | concentration of component (wt. %) | | | | | | |
|---|---|---|---|---|---|---|---|---|
| | | $K_2S_2O_5$ | KOH | aliphatic dicarboxylic acid | | polymer[1] | water | evaluation |
| | | | | kind | amount | | | |
| 1 | 1 | 1.4 | 2 | succinic acid | 5 | 1.5 | 90.1 | ○ |
| 2 | 5 | 7 | 10 | succinic acid | 5 | 1.5 | 76.5 | ○ |
| 3 | 10 | 14 | 20 | succinic acid | 5 | 1.5 | 59.5 | ○ |
| 4 | 13 | 18 | 22 | succinic aei d | 6 | 1.5 | 53.5 | ○ |
| 5 | 15 | 21 | 23 | succinic acid | 5 | 1.5 | 49.5 | ○ |
| 6 | 20 | 28 | 27 | succinic acid | 5 | 1.5 | 38.5 | × |
| 7 | 15 | 21 | 23 | malonic acid | 5 | 1.5 | 49.5 | ○ |
| 8 | 15 | 21 | 23 | adipic acid | 5 | 1.5 | 49.5 | ○ |
| 9 | 1 | 1.4 | 2 | succinic acid | 10 | 1.5 | 85.1 | ○ |
| 10 | 5 | 7 | 10 | succinic acid | 10 | 1.5 | 71.5 | ○ |
| 11 | 15 | 21 | 23 | succinic acid | 7 | 1.5 | 47.5 | ○ |
| 12 | 15 | 21 | 23 | succinic acid | 10 | 1.5 | 44.5 | ○ |

Note: [1] sodium polyacrylate

Comparative Preparation Example 1

Boiler water treatment composition shown in Table 2 were prepared using $K_2SO_3$ as the sulfurous acid compound and evaluated according to the same method as that in Preparation Example 1. Results are shown in Table 2.

Example 1 Change of a solution of agent with time

Change of concentration of $SO_3^{2-}$ ion was measured using Sample 5 prepared in Preparation Example 1 and Sample 13 prepared in Comparative Preparation Example 1 as test samples. Results are shown in Table 3.

TABLE 2

| sample No. | concentration of $SO_3^{2-}$ (wt. %) | concentration of component (wt. %) | | | | | | |
|---|---|---|---|---|---|---|---|---|
| | | $K_2S_2O_5$ | KOH | aliphatic dicarboxylic acid | | polymer[1] | water | evaluation |
| | | | | kind | amount | | | |
| 13 | 10 | 20 | 13 | succinic acid | 5 | 1.5 | 60.5 | Δ |
| 14 | 13 | 26 | 13 | succinic acid | 5 | 1.5 | 54.5 | × |
| 15 | 15 | 30 | 13 | succinic acid | 5 | 1.5 | 50.5 | × |
| 16 | 20 | 40 | 13 | succinic acid | 5 | 1.5 | 40.5 | × |

Note: [1] sodium polyacrylate

The results in Tables 1 and 2 show that a solution containing up to 15 weight % of $SO_3^{2-}$ ion can be prepared from $K_2S_2O_5$ and, in contrast, a solution containing more than 10 weight % of $SO_3^{2-}$ ion cannot be prepared from $K_2SO_3$. Therefore, 34 mg of Sample 5 (an agent of the present invention) is sufficient for eliminating 1 mg of

TABLE 3

| sample No. | concentration Of $SO_3^{2-}$ ion (wt. %) after designated time (day) | | | | |
|---|---|---|---|---|---|
| | 0 | 7 | 21 | 30 | 100 |
| 5 | 15 | 15 | 15 | 15 | 14 |
| 13 | 10 | 8 | 6 | 5 | 3 |

Concentration of $SO_3^{2-}$ ion was determined with a solution prepared by adding 5 ml of 6 N HCl, 5 ml of a 5 weight % aqueous solution of KI and a small amount of an aqueous solution of starch to 100 ml of a sample water by titration with a $KIO_3$ standard solution. When the colorless clear solution changed to a slightly blue solution, the titration had reached the end point.

The results in Table 3 show that Sample 5 (an agent of the present invention) showed almost no change in the concentration after 100 days while Sample 13 (a conventional agent) showed decrease in the concentration by 50% after 30 days.

Example 2 Test of prevention of corrosion

Into a 5 liter test boiler, softened water (pH, 8.5; 185 µS/cm; M alkalinity, 50 mg $CaCO_3$/liter; Cl ion, 10 mg/liter; $SiO_2$, 27 mg/liter; $SO_4$ ion, 22 mg/liter; Na ion, 33 mg/liter; Total hardness, 1 mg $CaCO_3$/liter or less) was supplied at the rate of 5 liter/hour and steam of 215° C. (pressure, 20 kg/cm²) was generated by heating. A specified amount of a solution of a compound dissolved in softened water was added to the supplied water using a constant rate pump. A test tube (soft steel; 176×20 mmφ; surface area, 114 cm²) was dipped into the boiler water and amount of corrosion was obtained from the difference of the weights of the test tube before and after the test. Blow ratio was 10% and concentration of dissolved oxygen in the supplied water was 6 mg/liter. Results are shown in Table 4.

TABLE 4

| sample No. | amount of agent added to supplied water (mg/liter) | amount decreased by corrosion (mg) | $SO_3^{2-}$ in water in boiler (mg/liter) |
|---|---|---|---|
| blank | 0 | 600 | 0 |
| 5 | 220 | 30 | 16 |
| 13 | 220 | 900 | 0 |

The results in Table 4 show that, in the case of Sample 13 (a conventional agent), the amount of the compound added to the supplied water was insufficient, leading to the result that $SO_3^{2-}$ ion could not be detected in the boiler water, and weight loss by corrosion was larger than that in the blank sample. In contrast, in the case of Sample 5 (an agent of the present invention), $SO_3^{2-}$ was detected in the boiler water and the result on corrosion was satisfactory.

Elimination of oxygen with sulfite ion has a fatal drawback in that the degree of corrosion becomes higher than that in case when no sulfite ion is when the added amount of an agent which is added is insufficient. This method has another drawback that addition of an agent in a larger amount is often impossible or economically disadvantageous because of relation with other added components and increase of heating energy.

Example 3 Test of prevention of scale formation

Into the same kind of boiler as that used in Example 2, test water (pH, 8.5; 165 µS/cm; M alkalinity, 45 mg $CaCO_3$/liter; Cl ion, 10 mg/liter; $SiO_2$, 26 mg/liter; $SO_4$ ion, 20 mg/liter; Na ion, 30 mg/liter; Total hardness, 10 mg $CaCO_3$/liter or less) was supplied at the rate of 5 liter/hour and steam of 215° C. (pressure, 20 kg/cm²) was generated by heating. Water in the boiler was blown continuously at the rate of 0.5 liter/hour (blow ratio, 10%) and concentrated to the 10 times concentration of the original test water.

A solution of a compound (Sample 5) dissolved in pure water was added to the supplied water using a constant rate pump. Scale formed was attached to the surface of the heating tube. Amount of the scale was obtained from collected scale by scraping the surface of the tube. Results are shown in Table 5.

TABLE 5

| sample No. | amount of added agent (mg/liter) | amount of attached scale (mg/cm²) |
|---|---|---|
| blank | 0 | 2.1 |
| 5 | 50 | 0.78 |
| 5 | 100 | 0.35 |
| 5 | 220 | 0 |
| 5 | 400 | 0 |

The results in Table 5 show that Sample 5 (an agent of the present invention) exhibits sufficient effect of prevention of scale formation as well.

To summarize the advantages obtained by the present invention, the boiler water treatment composition of the present invention is safe for human health, has excellent stability, can be used as a liquid formulation having anticorrosion activity (activity of eliminating oxygen) or both of anticorrosion activity and antiscale activity and exhibits enhanced anticorrosion activity by increasing concentration of sulfite ion which is an oxygen scavenger.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A liquid boiler water treatment composition which comprises (A) an anticorrosion effective amount of at least one member selected from the group consisting of metabisulfurous acid and metabisulfites; and (B) an amount from 10 to 150%, based on the amount of (A), of at least one member selected from the group consisting of succinic acid, adipic acid and sodium, potassium or ammonium salts thereof, effective to stabilize the composition and enhance the sulfite ion concentration imparted by (A) to boiler water to which the composition is added.

2. The composition of claim 1, which further comprises (C) a water-soluble polymer as a scale inhibitor in an amount of 1–200% by weight based on the amount of (A).

3. The liquid composition of claim 2, which further comprises an alkali agent in an amount of 10 to 100000 weight % based on the amount of (A).

4. The liquid composition of claim 1, which has a pH of 12.0 or higher.

5. The liquid composition of claim 1, wherein (A) is selected from the group consisting of metabisulfurous acid, sodium metabisulfite, potassium metabisulfite and ammonium metabisulfite.

6. The liquid composition of claim 2, wherein (A) is selected from the group consisting of metabisulfurous acid, sodium metabisulfite, potassium metabisulfite and ammonium metabisulfite.

7. The liquid composition of claim 2, wherein (C) is one or more polymers selected from the group consisting of homopolymers and copolymers of carboxylic acids.

8. The liquid composition of claim 3, wherein the alkali agent is one or more of sodium hydroxide, potassium hydroxide, sodium carbonate and potassium carbonate.

9. A boiler treatment method which comprises adding to boiler water, in an amount of 0.01 to 1000 mg/liter based on the amount of the boiler water, an aqueous boiler water treatment composition which comprises (A) an anticorrosion effective amount of at least one member selected from the group consisting of metabisulfurous acid and metabisulfites; and (B) an amount from 10% to 150%, based on (A) of at least one member selected selected from the group consisting of succinic acid, adipic acid, and sodium, potassium or ammonium salts thereof effective to stabilize the composition and enhance the sulfite ion concentration imparted by (A) to the boiler water.

10. The boiler water treatment method of claim 9, wherein the treatment composition is an aqueous solution which further comprises (C) a water-soluble polymer as a scale inhibitor in an amount from 1–200% by weight based on the amount of (A).

11. The boiler water treatment method of claim 10, wherein the treatment composition is an aqueous solution which further comprises an alkali agent in an amount of 10 to 100000 weight % based on the amount of (A).

12. The boiler water treatment method of claim 9, wherein the treatment composition is an aqueous solution having a pH of 12.0 or higher.

13. The boiler water treatment method of claim 9, wherein the treatment composition is an aqueous solution and (A) is selected from the group consisting of metabisulfurous acid, sodium metabisulfite, potassium metabisulfite and ammonium metabisulfite.

14. The boiler water treatment method of claim 10, wherein the treatment composition is an aqueous solution and (A) is selected from the group consisting of metabisulfurous acid, sodium metabisulfite, potassium metabisulfite and ammonium metabisulfite.

15. A storage stable aqueous solution useful as a boiler water treatment composition comprising (A) from 1.4 to 21 weight % of one or both of sodium or potassium metabisulfite; (B) a stabilizing amount from 10 to 150 weight % based on (A) of succinic or malonic acid; about 5 to 30 weight percent based on (A) of a water soluble polymer selected from the group consisting of polyacrylic acid, polymaleic acid, polymethacrylic acid, copolymers of acrylic acid and acrylamide, copolymers of acrylic acid and hydroxyallyloxypropanesulfonic acid and salts thereof; and an amount of an alkali agent sufficient to impart to the solution a pH greater than 12.

16. The aqueous solution of claim 15, wherein (B) is a salt of succinic; and (C) is a salt of polyacrylic acid.

* * * * *